United States Patent [19]

Kelley et al.

[11] 4,271,281

[45] Jun. 2, 1981

[54] PROCESS FOR PREPARING STYRENIC POLYMER PARTICLES

[75] Inventors: Donald J. Kelley; David J. Williams, both of Lunenburg; Stephen V. Slovenkai, Leominster, all of Mass.

[73] Assignee: American Hoechst Corporation, Somerville, N.J.

[21] Appl. No.: 154,184

[22] Filed: May 29, 1980

[51] Int. Cl.³ .............................................. C08F 2/20
[52] U.S. Cl. ......................................... 526/80; 526/88; 526/201
[58] Field of Search ................ 526/79, 80, 87, 88, 526/201, 202, 203

[56] References Cited

U.S. PATENT DOCUMENTS

| | | | |
|---|---|---|---|
| 2,932,629 | 4/1960 | Wiley | 526/201 |
| 3,714,103 | 1/1973 | Huhn | 526/203 |
| 3,725,367 | 4/1973 | Kemp | 526/201 |
| 3,772,226 | 11/1973 | Powell | 526/203 |
| 3,857,801 | 12/1974 | Kulas | 260/2.5 B |
| 4,085,169 | 4/1978 | Saito | 526/212 |
| 4,091,054 | 5/1978 | Saito | 526/80 |

FOREIGN PATENT DOCUMENTS 1255237  12/1971  United Kingdom.

*Primary Examiner*—Paul R. Michl

[57] ABSTRACT

Styrenic polymer particles having a uniform particle size distribution are prepared without the formation of fine polymer powders. The suspension polymerization process which comprises providing a stirred, aqueous suspension of polymeric seed particles, adding gradually to the suspension styrenic monomer and polymerizing it therein, and continuing the addition of monomer as the polymerization proceeds, may be improved by introducing the styrenic monomer below the surface of the suspension.

15 Claims, No Drawings

PROCESS FOR PREPARING STYRENIC POLYMER PARTICLES

BACKGROUND OF THE INVENTION

1. Field of the Invention

The present invention relates to an improved process for preparing styrenic polymer particles, particularly foamable styrenic polymer particles, having a substantially uniform particle size.

2. Description of the Prior Art

Styrene polymers in particulate form are conventionally prepared by a suspension polymerization process. However, such a process does not produce particles having a narrow size distribution. Particles having a narrow size distribution are desirable in view of their many advantages such as facilitating the supply of particles to a molding machine in unvarying quantities, producing moldings of uniform quality, and producing foamable particles which expand uniformly. Therefore, it is desirable to produce styrenic polymer particles having a narrow size distribution in an efficient manner.

British Pat. No. 1,255,237 discloses a suspension polymerization process for obtaining styrenic polymer particles of uniform particle size by dispersing previously prepared polymer particles having a small and uniform particle size (e.g. particles which have been sieved and collected) into an aqueous suspension, adding monomer containing a polymerization initiator to said suspension while stirring, and polymerizing the monomer within the polymer particles which act as nuclei for absorbing the monomer.

The above "seeding" process, however, does not produce as narrow a particle size distribution as is desired, and is particularly disadvantageous in that it tends to produce a large portion of fine powdery polymer. Such "fines" have no useful value, are difficult to recover and dispose of, and increase the cost of production.

Since this basic "seeding" process was first disclosed, there have been several attempts to eliminate some of the disadvantages associated with it. In U.S. Pat. No. 4,085,169 the patentee sought to reduce the quantity of fines produced in the seeding process by adding dropwise to the aqueous suspension of polymer particles a solution of styrene monomer, polymerization initiator and a polymerization retarder having a molecular weight of at least 200. It was theorized that the polymerization retarder inhibited the polymerization of the styrene monomer while in the fine oil droplet state, but allowed polymerization to proceed once the monomer was absorbed in the seed particles.

In U.S. Pat. No. 4,091,054 the patentees also sought to reduce the quantity of fines produced in the seeding process. Their attempt involved the simultaneous but separate dropwise addition of an initiator solution and a monomer solution to the suspension of seed particles. The initiator solution comprised 60–100% of the initiator in 1–10% of the monomer and the monomer solution comprised 0–40% of the initiator in 90–99% of the monomer.

It has been found that the above attempts at reducing the quantity of fines have introduced other problems to the seeding process. For example, the presence of polymerization retarder as called for by the first method is deleterious to the fusability of expanded particles during molding processes involving the application of heat and pressure. And the second method's task of preparing separate monomer and catalyst solutions and controlling their simultaneous but separate addition can be cumbersome and difficult. Also, the handling and storage of concentrated initiator solutions is potentially hazardous.

SUMMARY OF THE INVENTION

It has now been found that styrenic polymer particles having a narrow size distribution can be produced without an excessive quantity of concomitant fine powdery particles (fines) by carefully controlling the method of introduction of the styrenic monomer in the conventional seed polymerization process. In particular, it has been found that in the suspension polymerization process for preparing styrenic polymer particles having a narrow particle size range which comprises providing a stirred, aqueous suspension of polymeric seed particles, adding gradually to the suspension styrenic monomer, polymerizing the monomer in the suspension in the presence of suspension polymerization initiator, and continuing the addition of monomer to the suspension as the polymerization proceeds, said process may be improved by introducing the styrenic monomer below the surface of the suspension. Preferably the styrenic monomer is introduced below the suspension surface via a spray nozzle which produces a cone-shaped or fan-shaped spray pattern. Most preferably, the subsurface spray of styrenic monomer is directed parallel to the suspension surface.

DETAILED DESCRIPTION OF THE INVENTION

According to the present invention there is provided an improved suspension polymerization process for preparing styrenic polymer particles from styrenic monomer and polymeric seed particles. The seed particles are suspended in water, styrenic monomer is gradually introduced below the surface of the suspension, and the monomer is polymerized in the presence of suspension polymerization initiator as it is added to the suspension.

In particular, the present invention provides a suspension polymerization process which comprises (a) providing a stirred, aqueous suspension of polymeric seed particles which is maintained at a temperature sufficient to polymerize styrenic monomer;

(b) gradually adding styrenic monomer below the surface of said suspension and polymerizing said monomer in said suspension in the presence of suspension polymerization initiator; and (c) continuing the addition of said monomer as the polymerization proceeds.

It is theorized that the subsurface addition of monomer increases the frequency of collision between seed particles and monomer droplets. Thus, a higher percentage of monomer is absorbed by the seed particles, leaving a much lower fraction of unabsorbed monomer droplets to polymerize into small particles or fines.

The styrenic monomers and polymers utilized in the present invention are not, of course, limited to a monomer of styrene per se or a homopolymer of styrene per se, respectively, although styrene and polystyrene are most preferred.

The term styrenic monomer is meant to include any of the known polymerizable vinyl aromatic compounds and mixtures thereof, as well as mixtures of such vinyl aromatic compounds with other monomers copolymerizable therewith and/or crosslinking agents. Ordinarily the styrenic monomer will comprise no more than 40 weight precent other copolymerizable monomer and no more than 10 weight percent crosslinking agent.

Known polymerizable vinyl aromatic compounds include styrene, alkyl substituted styrenes such as α-methylstyrene, ar-ethylstyrene, p-methyl styrene and vinyl xylene, halogenated styrenes such as chlorostyrene, bromostyrene and dichlorostyrene, other styrenes having one or more nonreactive substituents on the benzene nucleus, and vinyl naphthalene.

Other monomers copolymerizable with vinyl aromatic compounds include various ethylenically unsaturated monomers such as acrylic esters (methyl acrylate, ethyl acrylate, etc.), methacrylic esters (methyl methacrylate, ethyl methacrylate, etc.), maleic and fumaric esters (dimethyl maleate, dimethyl fumarate, diethyl fumarate, etc.), nitriles (acrylonitrile, etc.), dienes (butadiene, isoprene, etc.) and the like. Cross-linking agents include divinylbenzene, polyethylene glycol dimethacrylate and the like. The styrenic monomer may also optionally include graft copolymerizable materials such as rubbers, polyolefins and the like.

The term styrenic polymer is meant to include any polymer composition of the above-defined styrenic monomer or monomers.

The polymeric seed particles which may be utilized in the present invention may comprise any polymeric material which is compatible with and permeable to styrenic monomer. The function of the seed particle is to absorb the monomer which will polymerize within and around it. Ordinarily the seed particles will comprise styrenic polymer—that is, the polymerization product of any of the styrenic monomer or monomers defined previously. However, the seed particles need not necessarily be styrenic. For example, polymer particles made from any of the monomers or graft copolymerizable materials defined previously may be used. Thus, the seed particles may also comprise polymethylmethacrylate, polybutadiene, polyethylene, and the like. It is preferred, however, that the polymeric seed particles be styrenic polymer, with polystyrene being most preferred.

Regardless of the polymeric material which is selected for use as seed particles in the process of this invention, it is important that these seed particles have a uniform particle size (i.e. a narrow particle size range) and be smaller than the size of the styrenic polymer particles to be prepared according to the present process. Uniform seed particles are necessary since the degree of uniformity in particle size of the final product depends closely on that of the seed particles. Generally the diameter of the largest seed particles should be no greater than twice the diameter of the smallest seed particles, and preferably no greater than 1.5 times the diameter of the smallest seed particles.

The particle size of the seed particles employed in the present process may vary depending upon the particle size of the final product desired and the amount of styrenic monomer utilized. For any given final product size, an increase in the size of the seed particle must be counter-balanced by a reduction in the amount of styrenic monomer and vice versa. Practically speaking, the seed particles should have an average particle size between 0.2 and 1.8 mm, preferably between 0.3 and 1.0 mm, and most preferably between 0.3 and 0.7 mm.

The polymeric seed particles may be prepared by using conventional polymerization techniques. For example, styrenic polymer seed particles may be prepared by suspension polymerizing styrenic monomer in the conventional manner. However, since conventional polymerization techniques generally produce polymer particles having a wide particle size distribution, the polymer particles must be screened or sieved to obtain seed particles having the desired size and uniformity.

The amount of styrenic monomer utilized in the process of the present invention will vary depending upon the size of the seed particles employed and the size of the particles desired. However, certain economic and practical limits must be considered. As the size of the seed particle approaches the size of the final product, the process becomes very uneconomical due to the small amount of monomer polymerized. On the other hand, if the amount of monomer is excessive the particle size distribution of the final product may be unacceptably wide. It has been found that the styrenic monomer should comprise 60-99%, preferably 80-95% and most preferably 85-90% by weight of the final polymer product.

The polymerization initiator utilized in the present invention may be selected from any of the conventional suspension polymerization initiators. Examples of such initiators are the organic peroxides such as benzoyl peroxide, lauroyl peroxide, t-butylperoxybenzoate, t-butylperoxypivalate, t-butylperoxy-2-ethylhexanoate and the like, and azo compounds such as azobisisobutyronitrile, azobisdimethylvaleronitrile and the like. Benzoyl peroxide is preferred. Advantageously the polymerization initiator is dissolved in the styrenic monomer to be polymerized. The initiator should be present in an amount sufficient to effect polymerization of the styrenic monomer. Ordinarily the amount of initiator will range from 0.3-0.8% based on the weight of monomer, preferably 0.4-0.6%.

The seed particles are ordinarily suspended in water with the aid of a suspending agent which may be selected from any of those conventionally used in suspension polymerizations. Typically the seed particles are dispersed in an aqueous suspension medium comprising water, suspending agent and optionally an anionic surfactant such as sodium lauryl sulfate or sodium dodecyl benzene sulfonate. Exemplary suspending agents are the water-soluble high molecular weight materials such as polyvinyl alcohol, methyl cellulose, etc. and the slightly soluble inorganic materials such as tricalcium phosphate, magnesium pyrophosphate, etc. Tricalcium phosphate is preferred. The suspending agent is generally used in an amount of from 0.3 to 0.6% based on the total weight of monomer and seed charged. The quantity of water in which the seed particles are suspended may vary, but generally it is preferred to use about 0.8 to 2 times the weight of polymer particles produced.

In the present process the reaction parameters of temperature and pressure may be selected from any of those used in conventional suspension polymerizations. Generally it is preferred to conduct the reaction below about 90° C., preferably at 80° to 90° C., and most preferably at about 85° C., under normal pressure. Obviously optimum reaction parameters may be determined for any particular selection of reactants, initiators, particle sizes, etc.

It has been found desirable to subject the polymer particles to increased temperature and pressure (cure stage) after polymerization is complete. The cure stage is preferably conducted by sealing the reactor and incressing the temperature of about 100° to 135° C. for 1 to 4 hours. Generally a cure catalyst is present in an amount up to about 0.15%. The cure catalyst may be selected from those organic peroxides and azo compounds which have a decomposition temperature about 20° to 30° C. higher than the primary initiator and which exhibit approximately a one hour half-life in benzene solution at the cure temperature employed. The cure catalyst may advantageously be dissolved in the monomer, and thus added to the process at the time of monomer addition. A preferred cure catalyst is 2,5-dimethyl-2,5-di (benzoyl peroxy) hexane. Prior to curing it may be beneficial to suspension stability to add more suspending agent.

When expandable particles are desired, it is necessary to add some expanding agent before, during or after the polymerization. Suitable expanding agents include aliphatic hydrocarbons such as propane, butane, isobutane, pentane, iso-pentane, neo-pentane, hexane, propylene, butylene, etc., cycloaliphatic hydrocarbons such as cyclobutane, cyclopentane, etc., and halogenated hydrocarbons such as methyl chloride, ethyl chloride, dichloro difluoro methane, chlorotrifluoromethane, etc. The expanding agent is impregnated into the polymer particles in an amount of from 2 to 15%, preferably 4 to 10% and most preferably 5 to 8%, by weight of the polymer particles. It is preferred to add the expanding agent just prior to raising the batch temperature for the cure stage. It is especially preferred to add the expanding agent through the subsurface nozzle since improved cell structure of the expanded product results.

Other additives which affect the properties or processability of the final polymer product may also optionally be included before, during or after the polymerization. Such additives may include waxes, surfactants, flame retardants, plasticizers, mold cooling agents, etc. It is preferred to introduce these additives, particularly the flame retardants, through the subsurface nozzle.

As mentioned previously, the present process is an improvement over conventional seeding processes due to the particular method of monomer addition which was discovered. While merely introducing the monomer below the suspension surface results in some improvement, it is preferred to make the addition through a spray nozzle, preferably one which produces a spray pattern (in air) which is fan-shaped or cone-shaped. It may be desirable to employ a plurality of subsurface nozzles to minimize stratification. It is also preferred to direct the subsurface spray of monomer parallel to the suspension surface and particularly toward the center of the reactor at an angle of about 45° from the agitator shaft, in the same direction of rotation as the agitator shaft. By parallel to the suspension surface it is meant that the axis of the cone pattern or the fan pattern is parallel to the surface of the liquid medium.

It is important to carefully control the rate of monomer addition if optimum results are to be achieved. If the rate of addition is too slow the product may contain a significant fraction of particles larger than desired and the cycle will be excessively long. If the rate of addition is too rapid an excessive quantity of fines may result. Also, the seed particles may tend to coalesce. Generally speaking, monomer should be added at about the same rate it is absorbed by the particles. From a practical standpoint, it has been found that good results may ordinarily be obtained by adding the monomer at a rate such that no more than 30% of it is added per hour. It is preferred to add monomer at a rate of about 9–17% per hour (based on the total weight of monomer to be charged) for the first two to four hours and 20–30% per hour thereafter until the addition is complete. Excellent results have been obtained with a monomer addition rate of 9–12% per hour for the first two hours, 15–17% per hour for the next two hours, and 22–30% per hour thereafter.

The invention may be described in greater detail by the following examples in which the parts and percentages are by weight.

EXAMPLE 1

To a stirred reactor was charged 200 Kg demineralized water, 1.63 Kg tricalcium phosphate slurried in about 3.2 Kg water with about 3–5 grams ammonium lauryl sulfate, and 41 Kg polystyrene beads of narrow bead size distribution [95% of sample passing through no. 30 U.S. mesh (600 microns) and caught on No. 35 U.S. Mesh (500 microns) screens] with the agitation rate set at 90 RPM. The reactor was blanketed with nitrogen and heated to 85° C., and a solution of 8 grams of sodium dodecyl benzene sulfonate in 150 grams of water was charged.

Monomer solution comprising 220 kg styrene, 1100 grams benzoyl peroxide and 219 grams 2,5-dimethyl-2,5-di(benzoyl peroxy) hexane was pumped into the reactor at a rate of 27 Kg per hour for 3.5 hours, then at 45 Kg per hour until the addition was complete. The monomer addition was made through a Spraco Flat nozzle (fan-shaped spray pattern) having a spray angle of 80 degrees and a 0.062-inch orifice, which nozzle was located below the suspension surface.

After the monomer addition was complete, about 11.6 kg of monomer solution containing a molding additive was pumped through the spray nozzle, followed by 27 Kg of demineralized water. Thirty minutes after the start of pumping water, 820 grams of tricalcium phosphate was charged, followed one hour later by 25 grams of lime.

Flame retarding agents (3448 grams) were then added, the nitrogen blanket discontinued, pumping of water ceased, and the reactor vent line closed. An additional 45 Kg of water was charged and the reactor sealed and pressurized to 5 p.s.i.g. with nitrogen. The agitation rate was increased to 120 R.P.M. and 22.3 Kg of blowing agent was charged. After an additional hour at 85° C. the batch was heated to 130° C., maintained at that temperature for two hours, cooled to 30° C., then dumped.

The particle size analysis is shown in the TABLE.

EXAMPLE 2

Example 1 was repeated except that the spray nozzle was removed and the monomer solution was introduced through a ½ inch pipe extended beneath the suspension surface. The particle size analysis is shown in the TABLE.

EXAMPLE 3 (Comparison)

Example 2 was repeated except that the monomer solution was dropped onto the suspension surface from a ½ inch line. The particle size analysis is shown in the TABLE.

TABLE

| | Distribution of Particle Sizes (weight %) | | |
|---|---|---|---|
| U.S. Sieve No. | Ex. 1 | Ex. 2 | Ex. 3 |
| 10 | — | 0.15 | 0.7 |
| 12 | — | 0.5 | 0.5 |

TABLE-continued

| U.S. Sieve No. | Distribution of Particle Sizes (weight %) | | |
|---|---|---|---|
| | Ex. 1 | Ex. 2 | Ex. 3 |
| 14 | — | 0.7 | 0.7 |
| 16 | 0.2 | 1.1 | 1.7 |
| 18 | 79.7 | 87.3 | 70.4 |
| 20 | 18.0 | 8.0 | 14.4 |
| 25 | 0.3 | 0.3 | 1.0 |
| 30 | 0.1 | 0.15 | 0.4 |
| 35 | — | 0.15 | 0.3 |
| 40 | — | 0.15 | 0.2 |
| 45 | — | 0.10 | 0.1 |
| 50 | 0.1 | 0.10 | 0.1 |
| PAN (fines) | 1.6 | 1.3 | 9.5 |

As can be seen from the above TABLE, the subsurface monomer addition of Examples 1 and 2 produced substantially fewer "fines" than the above surface addition of Example 3. In addition, it should be observed that the use of the spray nozzle in Example 1 resulted in a narrower particle size distribution than was obtained in Examples 2 and 3.

While the present invention has been described primarily with respect to the production of styrenic polymer particles, it should be readily apparent that this invention has equal applicability to the suspension polymerization of any liquid monomer in the presence of polymer seed particles.

What is claimed is:

1. In a suspension polymerization process for preparing styrenic polymer particles which comprises providing a stirred, aqueous suspension of polymeric seed particles, adding gradually to the suspension styrenic monomer, polymerizing the monomer in the suspension in the presence of suspension polymerization initiator, and continuing the addition of monomer to the suspension as the polymerization proceeds, the improvement which comprises introducing the styrenic monomer below the surface of the suspension.

2. The process of claim 1 wherein the styrenic monomer is introduced through a subsurface spray nozzle.

3. The process of claim 2 wherein the spray nozzle is selected from one that produces a spray pattern in air which is fan-shaped or cone-shaped.

4. The process of claim 3 wherein the spray nozzle is directed parallel to the suspension surface.

5. The process of claims 1, 2, 3 or 4 wherein the styrenic monomer has the suspension polymerization initiator dissolved therein.

6. The process of claim 5 wherein the styrenic monomer comprises 80-95% by weight of the polymer particles ultimately produced.

7. The process of claim 6 wherein the styrenic monomer is added at a rate such that 9-17% of said monomer is added per hour for the first two to four hours and 20-30% is added per hour thereafter.

8. The process of claim 1 which additionally comprises adding expanding agent below the surface of the suspension.

9. The process of claim 1 which additionally comprises adding flame retardant below the surface of the suspension.

10. A suspension polymerization process for preparing styrenic polymer particles which comprises
    (a) providing a stirred, aqueous suspension of styrenic polymer seed particles maintained at a temperature of about 80° to 90° C., said seed particles having an average particle size between 0.3 and 1.0 mm and a particle size range such that the diameter of the largest seed particles is no greater than 1.5 times the diameter of the smallest seed particles;
    (b) adding styrenic monomer to said stirred suspension through a spray nozzle which is located below the surface of said suspension in an amount such that said monomer comprises about 80-95% by weight of the polymer particles ultimately produced and at a rate such that 9-17% of said monomer is added per hour for the first two to four hours and 20-30% is added per hour thereafter, wherein said monomer has dissolved therein suspension polymerization initiator in an amount effective to cause polymerization of said monomer in said suspension; and
    (c) polymerizing said monomer in said suspension as it is added.

11. The process of claim 10 which additionally includes the step of curing the resultant polymer particles at 100°-135° C.

12. The process of claim 11 wherein the styrenic monomer has additionally dissolved therein up to 0.15% cure catalyst based on the weight of monomer.

13. The process of claim 12 wherein the spray nozzle is selected from one that produces a spray pattern in air which is fan-shaped or cone-shaped.

14. The process of claim 13 wherein the spray nozzle is directed parallel to the suspension surface.

15. In a suspension polymerization process for preparing polymer particles having a substantially uniform particle size distribution which comprises providing a stirred aqueous suspension of polymeric seed particles, adding gradually to said suspension a liquid monomer which can be effectively suspension polymerized in the presence of said polymeric seed particles, polymerizing said monomer in said suspension, and continuing the addition of monomer to the suspension as the polymerization proceeds, the improvement which comprises introducing the monomer below the surface of the suspension.

* * * * *